United States Patent Office 2,837,551
Patented June 3, 1958

2,837,551

PROCESS FOR PRODUCING BETA-CYANOETHYL-TRICHLOROSILANE

Victor B. Jex and John E. McMahon, Buffalo, N. Y., assignors to Union Carbide Corporation, a corporation of New York No Drawing. Application December 23, 1955
Serial No. 555,204

6 Claims. (Cl. 260—448.2)

This invention relates to a process for producing cyanoethylchlorosilane. More particularly, the invention relates to a process for producing beta-cyanoethyltrichlorosilane from acrylonitrile and a polychloropolysilane.

In accordance with our invention, beta-cyanoethyltrichlorosilane is produced by forming a mixture of acrylonitrile and a polychloropolysilane and by heating the mixture to a temperature sufficiently elevated to cause the components of the mixture to react. The reaction that takes place may be depicted by the following general equation where the polychloropolysilane employed is hexachlorodisilane:

$$N\equiv C-CH=CH_2+Cl_3Si-SiCl_3 \rightarrow N\equiv C-CH_2-CH_2SiCl_3 + \text{other products}$$

The process can be carried out by charging acrylonitrile and a polychloropolysilane, such as octachlorotrisilane, to a reactor and heating the mixture to a sufficiently elevated temperature to cause the acrylonitrile and octachlorotrisilane to react. When a reactant used in the process of the invention tends to vaporize at the reaction temperature employed, the process is preferably conducted in a closed reactor, as for example an autoclave.

The temperatures which we employ in carrying out our process are not narrowly critical and can vary over a wide range. For example temperatures as low as 150° C. and as high as 300° C. can be advantageously employed. Preferably, we employ temperatures of from about 200° C. to about 250° C. Temperatures below 150° C. and above 300° C. can also be used in the practice of our invention; however, no commensurate advantage is obtained thereby.

The polychloropolysilanes that we can employ in our process include those compounds which contain two or more silicon atoms to the molecule. The silicon atoms of the starting polychloropolysilanes are joined by silicon-to-silicon bonds and the remaining valences of such atoms are occupied by chlorine atoms. Illustrative of the polychloropolysilanes which can be employed are; hexachlorodisilane, octachlorotrisilane, decachlorotetrasilane and the like compounds.

The mechanism by which acrylonitrile reacts with a polychloropolysilane to produce beta-cyanoethyltrichlorosilane is not clearly understood. However, one possible explanation is that at elevated temperatures the polychloropolysilane decomposes forming trichlorosilyl radicals which then add to the omega carbon atoms of the acrylonitrile molecules that is, those furthest removed from the nitrile group. If such an explanation is correct there would be produced cyanoethyltrichlorosilane radicals having a free valence on the carbon atom which is in the beta position with respect to the silicon atom. This free valence may then be satisfied by a hydrogen atom donated by an unreacted acrylonitrile molecule with the formation of beta-cyanoethyltrichlorosilane and an acrylonitrile radical. The above possible mechanism may be depicted as follows where the polychloropolysilane employed in the present instance is hexachlorodisilane:

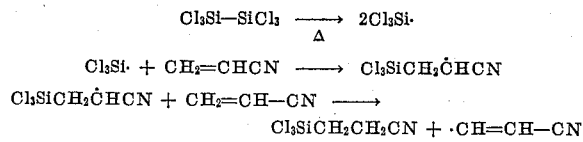

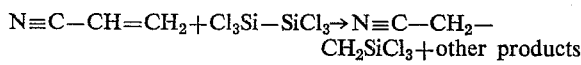

$$Cl_3SiCH_2\dot{C}HCN + CH_2=CH-CN \longrightarrow$$
$$Cl_3SiCH_2CH_2CN + \cdot CH=CH-CN$$

In addition to beta-cyanoethyltrichlorosilane there is obtained from the practice of our process several distillable fractions each of which were found, upon analysis, to contain silicon, carbon and nitrogen atoms with some of the fractions containing, in addition, hydrogen or chlorine atoms or both. Based upon our explanation of the reaction mechanism such fractions are apparently compounds or complexes formed by side reactions between or among the free radicals present. There is also obtained a non-distillable residue which is apparently composed in part of polymerized acrylonitrile.

When carrying out our process we prefer to employ the reactants in equal molecular amounts. Greater or lesser amounts of either of the starting materials may also be employed; however, no advantage is obtained thereby.

The following examples are illustrative of our invention.

*Example I*

To a three hundred cubic centimeter rocking autoclave were charged eleven one-hundredths (0.11) of a mole of hexachlorodisilane and eleven one-hundredths (0.11) of a mole of acrylonitrile. The autoclave was sealed and heated to a temperature of two hundred (200) degrees centigrade for a period of two hours. The autoclave was opened and the liquid product placed in a flask connected to a fractionating column and distilled. There was obtained 2 cc. of a product boiling at 80 degrees centigrade under 1.5 millimeters pressure. This product was identified as beta-cyanoethyltrichlorosilane by its boiling temperature, infrared spectra analysis and by determining the amount of hydrolyzable chlorine present therein (found 54.1 percent; theory 56.4 percent). Other distillable fractions were obtained and were found to contain carbon, silicon and nitrogen atoms with some containing either hydrogen or chlorine atoms or both. These products were not identified as distinct compounds. There remained in the fractionation flask an unidentified non-distillable residue.

*Example II*

To a three hundred cubic centimeter rocking autoclave were charged eleven one-hundredths (0.11) of a mole of octachlorotrisilane and eleven one-hundredths (0.11) of a mole of acrylonitrile. The autoclave was sealed and heated to a temperature of two hundred (200) degrees centigrade for a period of two hours. The autoclave was opened and the liquid product placed in a flask connected to a fractionating column and distilled. There was obtained 4 cc. of a product boiling at 77–80 degrees centigrade under 4.5 millimeters pressure. This product was identified as beta-cyanoethyltrichlorosilane by its boiling temperature, infra-red spectra analysis and by determining the amount of hydrolyzable chlorine present therein (found 55.8 percent; theory 56.4 percent). Other distillable fractions were obtained and were found to contain carbon, silicon and nitrogen atoms with some containing either hydrogen or chlorine atoms or both. These products were not identified as distinct compounds. There remained in the fractionation flask an unidentified non-distillable residue.

Beta-cyanoethyltrichlorosilane has been disclosed and claimed as a new composition of matter in copending U. S. application Ser. No. 555,201 filed concurrently herewith. The compound has been found useful for numerous purposes, particularly as a starting material for the production of gamma-aminopropyltriethoxysilane.

What is claimed is:

1. A process for the production of beta-cyanoethyltrichlorosilane which comprises forming a mixture of acrylonitrile and a polychloropolysilane composed of silicon and chlorine and heating said mixture to a temperature sufficiently elevated to cause said acrylonitrile and polychloropolysilane to react.

2. A process for the production of beta-cyanoethyltrichlorosilane which comprises forming a mixture of acrylonitrile and a polychloropolysilane composed of silicon and chlorine and heating said mixture in a closed reactor to a temperature of at least about 150° C.

3. A process for the production of beta-cyanoethyltrichlorosilane which comprises forming a mixture of acrylonitrile and hexachlorodisilane and heating said mixture to a temperature sufficiently elevated to cause said acrylonitrile and hexachlorodisilane to react.

4. A process for the production of beta-cyanoethyltrichlorosilane which comprises forming a mixture of acrylonitrile and octachlorotrisilane and heating said mixture to a temperature sufficiently elevated to cause said acrylonitrile and octachlorotrisilane to react.

5. A process for the production of beta-cyanoethyltrichlorosilane which comprises forming a mixture of acrylonitrile and hexachlorodisilane and heating said mixture in a closed reactor to a temperature of at least about 200° C.

6. A process for the production of beta-cyanoethyltrichlorosilane which comprises forming a mixture of acrylonitrile and octachlorotrisilane and heating said mixture in a closed reactor to a temperature of at least about 200° C.

References Cited in the file of this patent

UNITED STATES PATENTS

| | | |
|---|---|---|
| 2,598,435 | Mohler et al. | May 27, 1952 |
| 2,709,176 | Bluestein | May 24, 1955 |
| 2,721,873 | MacKenzie | Oct. 25, 1955 |

FOREIGN PATENTS

| | | |
|---|---|---|
| 961,878 | France | Nov. 28, 1949 |